United States Patent
Larsson et al.

(10) Patent No.: US 9,181,871 B2
(45) Date of Patent: Nov. 10, 2015

(54) INDIRECTLY HEATED GAS TURBINE SYSTEM

(75) Inventors: Stefan Larsson, Solgården (SE); Anders Lindström, Solgården (SE); Hansi Kobes, Västervik (SE)

(73) Assignee: Maston AB (SE)

( * ) Notice: Subject to any disclaimer, the term of this patent is extended or adjusted under 35 U.S.C. 154(b) by 369 days.

(21) Appl. No.: 13/994,987

(22) PCT Filed: Dec. 15, 2011

(86) PCT No.: PCT/SE2011/051519
§ 371 (c)(1),
(2), (4) Date: Jun. 17, 2013

(87) PCT Pub. No.: WO2012/082062
PCT Pub. Date: Jun. 21, 2012

(65) Prior Publication Data
US 2013/0269344 A1 Oct. 17, 2013

(30) Foreign Application Priority Data
Dec. 15, 2010 (SE) ...................................... 1051322

(51) Int. Cl.
*F02B 3/00* (2006.01)
*F02C 1/05* (2006.01)
*F02C 1/04* (2006.01)
*F02C 1/06* (2006.01)
*F02C 1/10* (2006.01)

(52) U.S. Cl.
CPC ... *F02C 1/05* (2013.01); *F02C 1/04* (2013.01); *F02C 1/06* (2013.01); *F02C 1/10* (2013.01); *F05D 2250/82* (2013.01); *Y02T 50/672* (2013.01)

(58) Field of Classification Search
CPC .................. F02C 1/04; F02C 1/06; F02C 1/10
USPC .................................. 60/597, 606, 608, 39.01
See application file for complete search history.

(56) References Cited

U.S. PATENT DOCUMENTS 6,066,898 A * 5/2000 Jensen ............................ 290/52
2008/0041057 A1 2/2008 Thomas

FOREIGN PATENT DOCUMENTS

| FR | 2913724 | 9/2008 |
|----|---------|--------|
| GB | 2402172 | 12/2004 |
| GB | 2420382 | 5/2006 |
| WO | WO 00/09862 | 2/2000 |
| WO | WO 02/39045 | 5/2002 |
| WO | WO 02/055855 | 7/2002 |
| WO | WO 03/093665 | 11/2003 |

OTHER PUBLICATIONS

International Search Report for International Application No. PCT/SE2011/051519, dated Mar. 20, 2012, 3 pages.

* cited by examiner

*Primary Examiner* — Ching Chang
(74) *Attorney, Agent, or Firm* — Foley & Lardner LLP

(57) ABSTRACT

The present invention relates to an indirectly heated gas turbine system comprising a combustion chamber (3) that extends along a central axis of the gas turbine system for the combustion of compressed air and supplied fuel whereby flue gas is formed, a turbine (2) driven by a working medium, a compressor (1) rotatably connected to the turbine for compressing the working medium and/or air to the combustion chamber, and a first heat exchanger device (8) for the transfer of heat between the flue gas and the working medium. The first heat exchanger device and the combustion chamber are integrally formed as a monolithic unit, the first heat exchanger device being substantially arranged within the axial extension of the combustion chamber along the central axis. By the integrated design of the combustion chamber and the first heat exchanger device, a compact, indirectly heated gas turbine system having high efficiency is achieved.

29 Claims, 4 Drawing Sheets

INDIRECTLY HEATED GAS TURBINE SYSTEM

The present invention relates to an indirectly heated gas turbine system comprising a combustion chamber for the combustion of compressed air and supplied fuel whereby flue gas is formed, a turbine driven by a working medium, a compressor rotatably connected to the turbine for compressing the working medium and/or air to the combustion chamber, and a first heat exchanger device for the transfer of heat between the flue gas and the working medium.

TECHNICAL BACKGROUND OF THE INVENTION

A gas turbine is a turbine driven by flowing combustion gases from a combustion chamber, which is the proper source of power. Accordingly, a gas turbine is the same thing as a jet engine where the gases, instead of flowing out into a jet, are allowed to drive a turbine rotatably connected to, for instance, an electric generator. Therefore, a usual field of application for the gas turbine is electric power generation.

Gas turbines have very high power in relation to their size and weight and are of a relatively simple construction compared to piston engines. Furthermore, gas turbines have lower emission upon combustion and have fewer movable parts than piston engines. Smaller gas turbines, so-called micro turbines, usually have low efficiency, while gas turbines of the size 1 MW and above achieve higher efficiency, however never comparable to the one of piston engines. At a power above 1 MW, however, the gas turbine soon becomes a much cheaper alternative, such that it, in spite of the difference in efficiency, may surpass the piston engine.

The work process in a gas turbine, where the main components are a compressor, a combustion chamber and a turbine, is described by the Brayton cycle, which is a thermodynamic cycle. Air from the surroundings is sucked into one or more compressor steps, where it is compressed. The compressed air is then fed to the combustion chamber wherein it is combusted together with supplied fuel. The hot flue gas formed by combustion is then allowed to expand through one or more turbine steps where it, in doing so, dissipates its energy. The turbine step is usually rotatably connected to the compressor step to drive the same, but the compressor step may also be driven by a separate motor or another source of energy.

In the ideal case, the compression and the expansion are isentropic processes, i.e., the entropy of the system remains constant. However, because of energy losses through the compressor and the turbine of a real gas turbine, these processes are adiabatic. Compression and expansion take place so fast that, in principle, there is no heat transfer to or from the working medium. When the pressure increases by compression, adiabatic heating takes place and the working medium, in this case the entrained ambient air, is heated. Adiabatic cooling occurs when the pressure decreases by expansion in the turbine. Parts of said dissipated heat can be extracted in the form of work to drive the turbine. By virtue of higher efficiency, a greater part of the heat energy can be extracted.

A micro turbine is, as the name states, a small high-speed gas turbine, which has lower pressure and temperature in the combustion chamber, compared with a greater gas turbine. A micro turbine typically has a developed power in the range of 50-500 kW and a size of about 3 m$^3$ with a total weight of 2 t or more.

As fuel to drive a gas turbine, usually different fossil fuels are used, such as natural gas (methane, propane), petrol, diesel, fuel oil, liquefied petroleum gas, and digested sludge, or non-fossil fuel such as biogas, biodiesel, and E85 (a mixture of approx. 85% ethanol and approx. 15% petrol). In practice, natural gas is predominantly used, which has the lowest emission values. Also biomass fuels in solid form, such as wood pellets, reed, straw or grass have been targeted as candidates, but are associated with the disadvantage that the flue gas and the combustion products from the combustion chamber may cause fouling and contamination of the turbine blades when passing the turbine step, which may increase the energy losses and thereby lower the efficiency of the gas turbine. The turbine blades also risk being exposed to chemical attack in the form of corrosion, depending on which fuel is used.

Therefore, in gas turbines heated by solid biomass fuel, it is desirable to use a working medium, also called expansion gas or turbine air, which is separated from the flue gas. In a so-called indirectly heated work cycle, heat is transferred from the flue gas to the working medium by means of a heat exchanger, said media being held physically separated.

WO 03/093665 discloses an indirectly heated micro turbine that utilises the Brayton cycle in a gas turbine having separate cycles for flue gas and working medium. The combustion chamber is placed at a distance from the heat exchanger, the flue gas being fed from the combustion chamber to the heat exchanger wherein the heat thereof is transferred to the compressed working medium from the compressor.

Other examples of indirectly heated (micro) gas turbines are given by GB 2 402 172, FR 2 913 724 and US 2008/0041057.

WO 02/39045 discloses a directly heated gas turbine system, which has a ring-shaped recuperator for the transfer of heat between turbine exhaust fume and combustion air, including a compressor, a combustion chamber, and a turbine arranged within the internal diameter of the recuperator.

A disadvantage of the known technique is that it often has a low efficiency because of energy losses in the gas turbine system along the path followed by the working medium and/or of the flue gas from the compressor via the combustion chamber and the heat exchanger to the turbine, which contributes to lower the efficiency.

GB 2 420 382 and WO 02/055855 disclose indirectly heated gas turbine systems that have a heat exchanger situated inside a combustion chamber. By placing the heat exchanger inside the combustion chamber, the combustion gases generated during combustion may pass around the outside of the conduit of the heat exchanger and heat the fluid passing through the conduit, while the combustion gas and the fluid are held separated. The heat exchanger is designed to be readily dismantled and removed from the combustion chamber for cleaning.

One disadvantage of this type of construction is that it requires a relatively large space, something which prevents integration into, for example, vehicles of the private car type or other systems having requirements of compactness. Another drawback is that the heat exchanger must be cleaned at regular intervals to remove byproducts from combustion, such as soot or carbonaceous deposits.

Therefore, there is a need of developing compact, indirectly heated gas turbines having high efficiency.

SUMMARY OF THE INVENTION

The object of the present invention is to provide a compact, indirectly heated gas turbine system having high efficiency, which can be used for the operation of, for instance, vehicles by biomass fuel in solid form.

This is achieved by an indirectly heated gas turbine system according to claim 1, comprising a combustion chamber having a longitudinal extension arranged along a central axis of the gas turbine system, for the combustion of air and supplied fuel whereby flue gas is formed, a turbine driven by a working medium, a compressor rotatably connected to the turbine for compressing the working medium of the turbine and/or air into the combustion chamber, and a first heat exchanger device for the transfer of heat between the flue gas and the working medium, the first heat exchanger device and the combustion chamber being integrally formed as a monolithic unit, and the first heat exchanger device being substantially arranged within the longitudinal extension of the combustion chamber along the central axis.

By integration of the heat exchanger and the combustion chamber in a monolithic unit, the heat losses in the passage of the flue gas from the combustion chamber to the heat exchanger can be efficiently decreased. The system utilises both radiant heat from the combustion chamber and convection heat in the first heat exchanger device in the heating of the working medium. In such a way, an increased input temperature of the working medium at the inlet to the turbine can be achieved.

Likewise, a considerable decrease of the volume of the gas turbine system can be provided, which allows incorporation in, for instance, a vehicle, such as a private car or the like.

In a preferred embodiment, the combustion chamber is substantially cylindrical and the first heat exchanger device is arranged coaxially with the combustion chamber around the outer diameter of the combustion chamber. Radiant head from the combustion chamber is thereby transferred radially outward to the first heat exchanger device.

In a further advantageous embodiment, the first heat exchanger device comprises a convection heat exchanger, through which the working medium and the flue gas have counter-directed flow directions.

In another preferred embodiment, the first heat exchanger device comprises heat transfer channels for the flue gas in the form of a plurality of parallel pipes, running longitudinally along the combustion chamber, which are symmetrically arranged and equidistantly distributed around the circumference of the combustion chamber. The heat transfer channels may be designed to be substantially symmetrical in terms of flow for the flue gas at the outlet of the combustion chamber, which means that the flow of the flue gas is evenly distributed between the heat transfer channels. This may preferably be achieved by the cross-sectional area of at least two adjacent heat transfer channels, seen in the same plane perpendicular to the central axis, having substantially the same surface area.

In a further advantageous embodiment, the first heat exchanger device comprises a heat transfer passage for the working medium of the turbine in the form of a helical channel running substantially tangentially around the circumference of the combustion chamber. The helical shape facilitates heat transfer to the working medium, both from the combustion chamber and the flue gas.

In another preferred embodiment, the gas turbine system further comprises a second heat exchanger device placed right in front of the outlet of the combustion chamber. Preferably, the second heat exchanger device is designed and placed such that the working medium passes the second heat exchanger device just before it is fed into the turbine via the inlet of the turbine. Through the second heat exchanger device an additional temperature increase of the working medium is achieved immediately before the inlet to the turbine.

In yet another preferred embodiment, the second heat exchanger device comprises a swirl chamber having a heat transfer surface that faces away from the combustion chamber, designed such that the working medium skims the heat transfer surface several times before the working medium exits into the turbine. With longer exposure to the heat transfer surface, a higher temperature and a more even temperature distribution in the working medium is achieved.

According to another preferred embodiment of the present invention, the gas turbine system further comprises a generator integrated in the inlet of the compressor, whereby an air flow into in the compressor cools the stator windings of the generator.

In a further advantageous embodiment, the first heat exchanger device and the combustion chamber together form a low-temperature section made from welded steel. Preferably, the external wall of the combustion chamber and/or the outer cover of the gas turbine system are/is corrugated, forming a bellows function where the material is allowed to expand in the axial direction.

In another preferred embodiment, the second heat exchanger device forms a high-temperature section made from sintered and/or cast ceramics.

In yet another preferred embodiment, the gas turbine system further comprises means for the regulation of the flow of the working medium of the flue gas partly past the first and/or the second heat exchanger device. Thus, the temperature of the working medium and/or the flue gas may be controlled for optimise operation of the gas turbine system.

According to another preferred embodiment of the present invention, the fuel consists of biomass fuel in solid form. Preferably, the biomass fuel consists of wood pellets.

The present invention also relates to a vehicle comprising a gas turbine system according to any of the embodiments.

DETAILED DESCRIPTION OF THE INVENTION

The gas turbine system will be described below more in detail, reference being made to the fig.s. However, the invention should not be considered limited to the embodiment or embodiments shown in the fig.s and described below, but may be varied within the scope of the claims.

In the present disclosure the term 'monolithic unit' should be interpreted as meaning a unit formed to constitute one piece, which may not be taken apart or in other ways disassembled, unless explicitly stated otherwise.

Generally, for all types of heat engines, which convert thermal energy (heat) to mechanical energy (work), the efficiency $\eta$ is defined as the ratio between extracted work, W, and supplied amount of heat, Q:

$$\eta = \frac{W}{Q}$$

Since a real heat engine is limited because of energy losses, the entire supplied amount of heat cannot be converted into work, but a certain amount is dissipated to the surroundings as waste heat:

$$Q_{in} = W + Q_{ut}$$

The efficiency will then be:

$$\eta = \frac{Q_{in} - Q_{out}}{Q_{in}} = 1 - \frac{Q_{ut}}{Q_{in}}$$

When regarding a heat engine that works between two fixed temperatures, in this case a gas turbine that works according to the Brayton cycle, it is possible to derive that the supplied amount of heat and the dissipated waste heat corresponds to the temperature of the working medium at the inlet and outlet, respectively, of the turbine, which yields the efficiency:

$$\eta = 1 - \frac{T_{ut}}{T_{in}}$$

Accordingly, it is realised that raising the temperature of the working medium at the inlet of the turbine can contribute to increasing the efficiency of the gas turbine.

Figure 1:
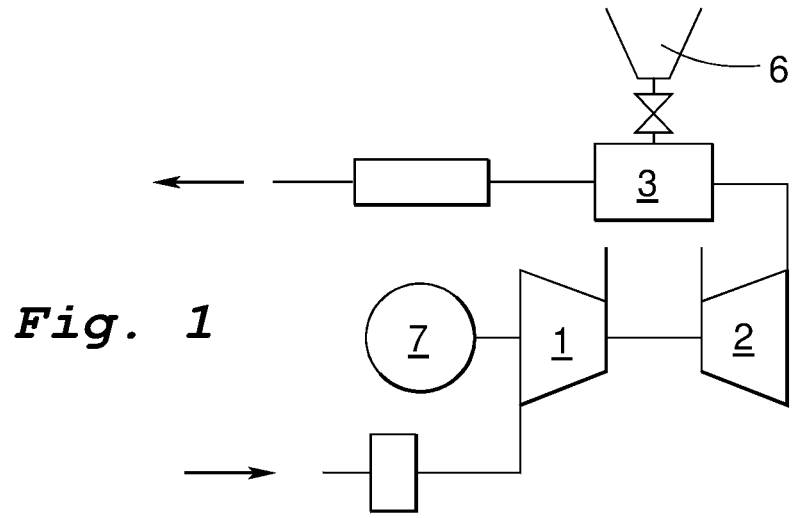
FIG. 1 shows an explanatory sketch of a gas turbine system according to the known technique.

FIG. 1 shows an explanatory sketch of a gas turbine system according to the known technique having a compressor 1 rotatably connected to a turbine 2. The compressor 1 is usually an axial compressor consisting of a number of multi-bladed propellers that rotate on a common shaft inside a pipe. Between the propellers, there are fixed rings having blades that direct the air current axially rearward toward the next propeller. Air from the surroundings is drawn into the compressor 1, whereby it is compressed and fed to the combustion chamber 3. The combustion chamber 3 is also supplied with fuel from a fuel stock 6, which is combusted together with the compressed ambient air. The resulting flue gas is then fed to the turbine 2, whereupon it is allowed to expand so as to drive the rotor of the turbine. By the connection of the turbine 2 with the compressor 1, a part of the extracted work is used to drive the compressor 1.

The remaining part of the amount of energy is extracted by means of a generator 7, which also is rotatably connected to the turbine 2. Usually, the generator 7 also acts as starter motor of the gas turbine system.

The gas turbine system may also contain other components such as, for instance, air filters for the inlet air to the compressor 1 or sound-absorber for the exhaust fume from the combustion chamber 3.

Figure 2:
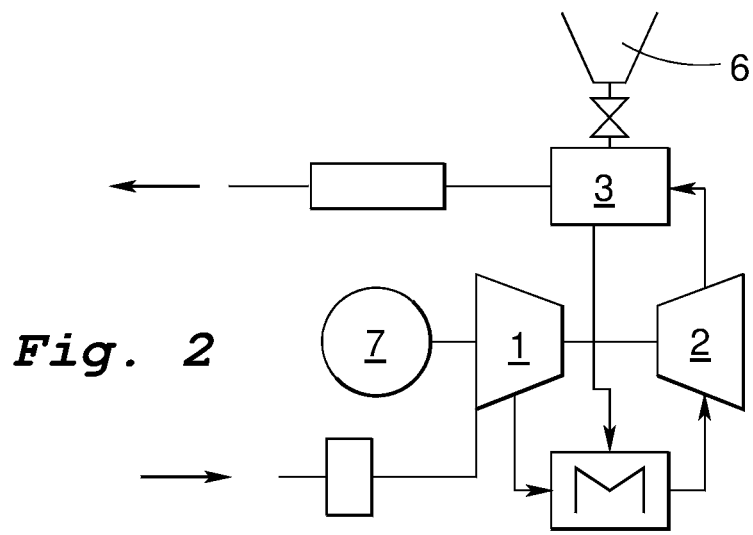
FIG. 2 shows an explanatory sketch of the indirectly heated Brayton cycle.

In FIG. 2, the indirectly heated work cycle (the Brayton cycle) is illustrated in a principal diagram. In addition to the above mentioned components, also a heat exchanger 8 is included here for the transfer of heat from the flue gas from the combustion chamber 3 to the working medium of the turbine 2, also called expansion gas or turbine air. Thereby, fouling of the turbine 2 is avoided. The heat from the working medium at the turbine outlet may be recovered, by means of a recuperator, wherein the heat is transferred by heat exchange to another medium for heating, for instance water.

Another possibility is to feed the exhaust fume from the turbine outlet into the flame in the combustion chamber 3 and heat the fuel before combustion. This reduces the fuel consumption, since less heat needs to be supplied to the combustion chamber for a certain given operating temperature or operating power. Since the flue gas never passes the turbine 2, options are opened to use, e.g., fuel in solid form, which otherwise is associated with increased contents of polluting residues in the exhaust fumes.

Figure 3:
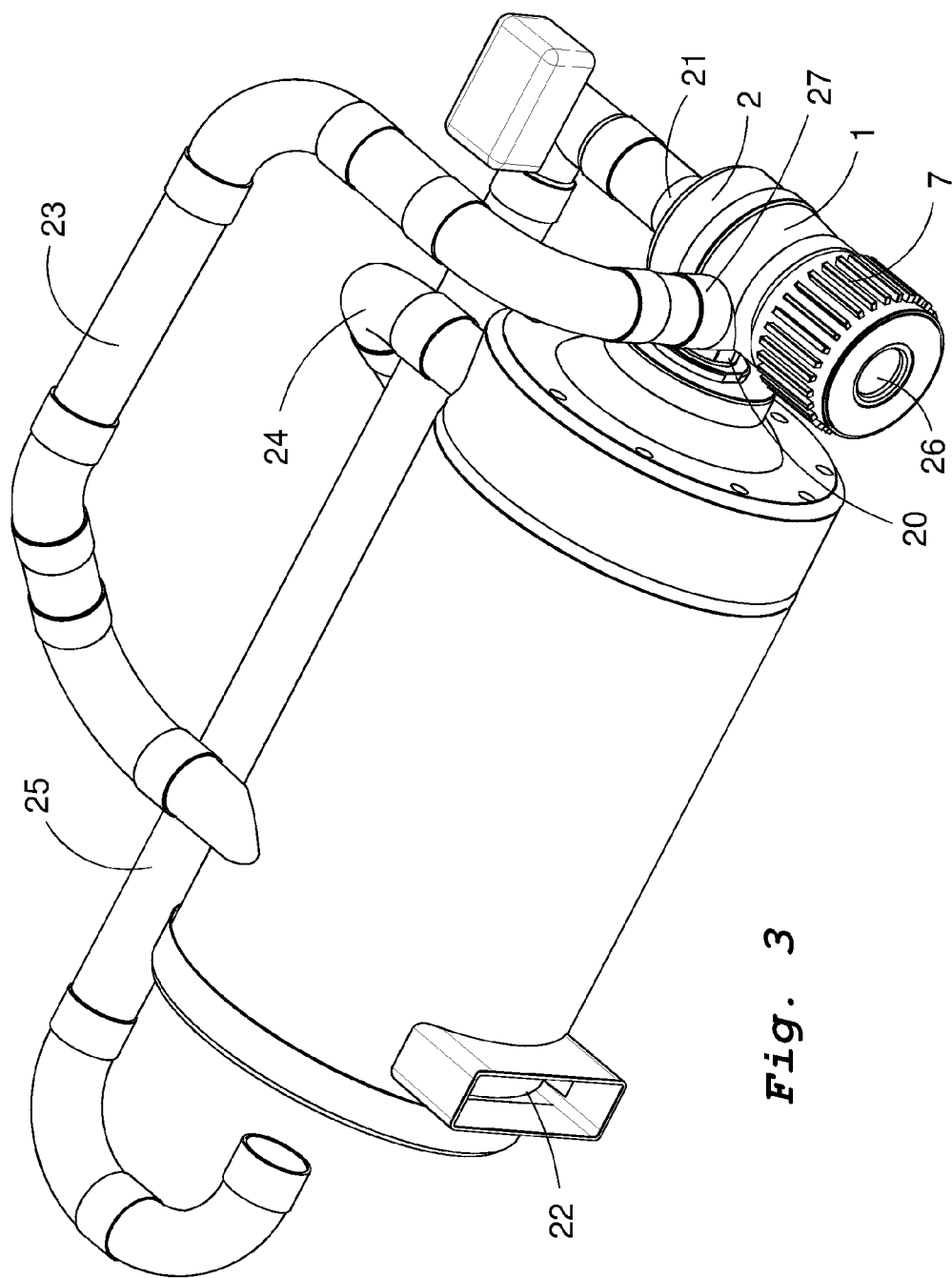
FIG. 3 shows a gas turbine system according to the present invention in a perspective view.

FIG. 3 shows a gas turbine system according to the present invention in a perspective view. The gas turbine system comprises a compressor 1 and a turbine 2 that are rotatably connected with each other by a common shaft. A generator 7 may be integrated in the inlet of the compressor 1, so that the air flow through the compressor 1 cools the stator windings of the generator 7.

Figure 4:
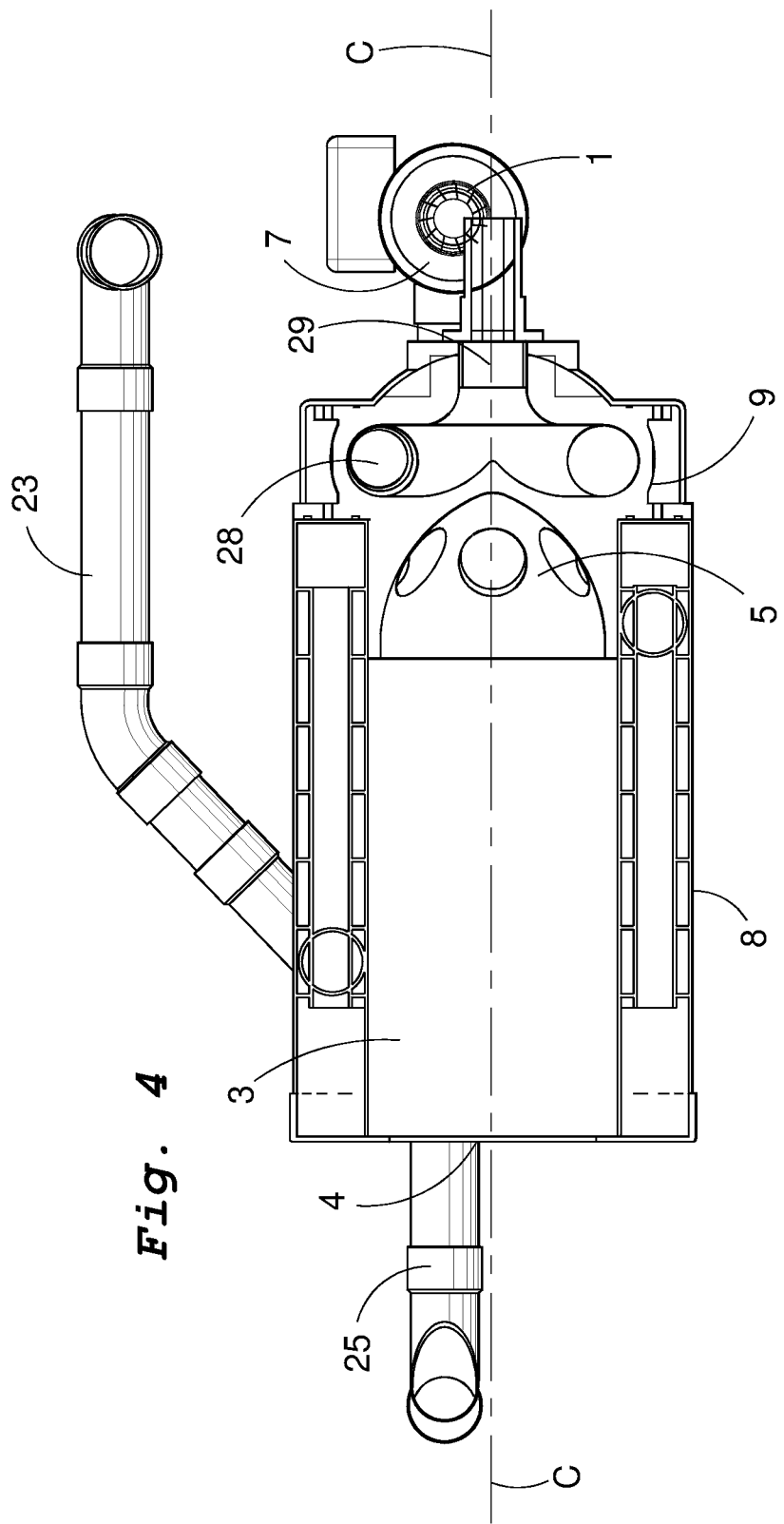
FIG. 4 shows a cross-section in the longitudinal direction through the gas turbine system according to the present invention in a side view.

FIG. 4 shows a cross-section in the longitudinal direction through the gas turbine system according to the present invention in a side view. A combustion chamber 3 extends in the longitudinal direction along the central axis C of the gas turbine system. Preferably, the central axes C of the combustion chamber 3 and the gas turbine system coincide. One end of the combustion chamber 3 has a combustion chamber inlet 4 for the supply of fuel from a fuel stock (not shown) adjacent to the gas turbine system. In a preferred embodiment, the gas turbine system may be heated with biomass fuel in solid form, such as wood pellets, which is supplied to the combustion chamber 3 from a stock of pellets by means of a feed screw (not shown). Herein, the combustion chamber 3 has a cylindrical design, but also other embodiments are feasible, such as a cubic, ring-shaped, conical or irregular shape.

In the other end of the combustion chamber 3, the flue gases from the combustion are discharged through a combustion chamber outlet 5 via radially outwardly directed outlet openings 10 to a first heat exchanger device 8. The first heat exchanger device 8 is integrally formed with the combustion chamber 3 in order to obtain a monolithically formed unit, a low temperature section. In the context of the present invention it should be understood that the term 'monolithic unit' is to be interpreted as meaning a unit formed in one piece, which may not be taken apart or in other ways disassembled. The monolithic construction may for instance be achieved by welding the first heat exchanger device 8 and the combustion chamber 3 together, or joining them together permanently in other appropriate ways. Another conceivable solution would be to mould the first heat exchanger device 8 and the combustion chamber 3 in one piece.

The low temperature section is designed to maximally utilise the radiant heat from the combustion chamber 3 in the radial direction to heat the working medium, by the first heat exchanger device 8 being substantially arranged within the longitudinal extension of the combustion chamber 3 along the central axis C. A person skilled in the art appreciates that also a construction wherein a part of the first heat exchanger device 8 extends outside the longitudinal extension of the combustion chamber 3, for instance adjacent to the combustion chamber outlet 5, falls within the scope of the invention. In a preferred embodiment, the first heat exchanger device 8 is arranged coaxially with the combustion chamber 3 around the outer diameter of the combustion chamber 3 in order to form a compact unit.

Figure 5:
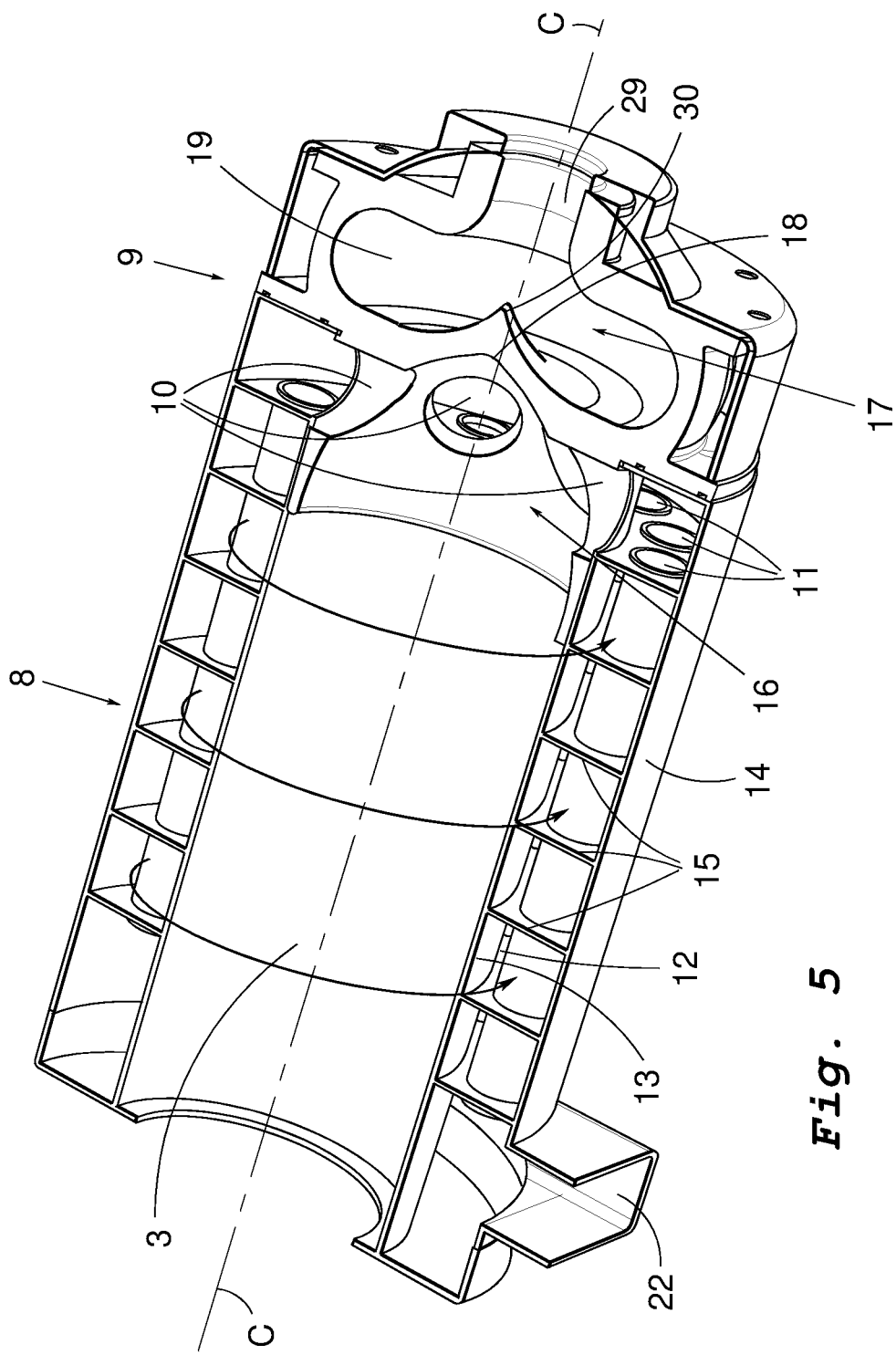
FIG. 5 shows a cross-section in the longitudinal direction through the gas turbine system according to the present invention in a perspective view.

FIG. 5 shows a cross-section in the longitudinal direction through the gas turbine system according to the present invention in a perspective view. The first heat exchanger device 8 may advantageously be formed as a convection heat exchanger wherein the working medium and the flue gas have counter-directed flow directions. Such a heat exchanger may consist of heat transfer channels 11 for the flue gas in the form of a plurality of parallel pipes, running longitudinally along the combustion chamber, which are symmetrically arranged and equidistantly distributed around the circumference of the combustion chamber. The cross-section areas of the heat transfer channels 11 may have the same area, the heat transfer channels 11 being substantially symmetrical in terms of flow for the flue gases at the outlet 5 from the combustion chamber 3. This means that the flue gas is distributed uniformly between the heat transfer channels 11 upon throughput, which provides a homogeneous temperature distribution and highest possible heat transfer without the extra pressure drop that otherwise arises when the mass flow is to be balanced through the channels of the heat exchanger in an indirectly heated turbine. The flow of the flue gas through the heat transfer channels 11 is substantially in the axial direction parallel to the central axis of the gas turbine system.

The first heat exchanger device 8 may also have a heat transfer passage 12 for the working medium. The working medium consists of compressed air from the compressor 1, which is fed via a pipe line 23 to the heat transfer passage 12. This heat transfer passage 12 may be a channel limited by the outside of the external wall 13 of the combustion chamber 3 and the outer cover 14 of the gas turbine system in the radial direction, and by intermediate walls 15 that extend from the external wall 13 of the combustion chamber to the outer casing 14 around the circumference of the combustion chamber 3 in the axial direction. Accordingly, the heat transfer passage 12 may form a helical passage running at least one turn around the circumference of the combustion chamber 3 in the tangential direction. Adjacent turns of the passage 12 are airtight against each other. The flow of the working medium through the heat transfer passage 12 is substantially in the tangential direction around the central axis C of the gas turbine system, as illustrated by the arrows in FIG. 5.

The heat transfer channels 11 for the flue gas intersect the partition walls 15 of the heat transfer passage 12. The contact surfaces, where the pipes of the heat transfer channels 12 meet the partition walls 15, are air-proof so that the flue gas does not contact the working medium. On the other hand, the heat is transferred from the flue gas to the working medium by convection. The flue gas is discharged from the first heat exchanger device 8 via flue gas outlets 22. The heated working medium is then fed further toward the turbine 2 via a pipe line 24.

In a preferred embodiment, the low-temperature section is made from 355 welded steel and adapted to increase the temperature of the working medium to 500-700° C.

The gas turbine system may furthermore be provided with a second heat exchanger device 9, also called high-temperature section, adjacent to the inlet 20 of the turbine 2. In that case, the outlet openings 10 of the combustion chamber may be arranged in the primary side 16 of the second heat exchanger device 9, the surface of which faces the combustion chamber 3.

On its way from the first heat exchanger device 8 to the turbine inlet 20, the working medium passes the secondary side 17 of the second heat exchanger device 9, the surface of which faces away from the combustion chamber 3. The secondary side 17 may be formed as a swirl chamber 19 placed right in front of the combustion chamber outlet 5. This position represents the heat radiation centre 18 of the combustion chamber 3 where the radiant heat from the combustion chamber reaches its highest value. The swirl chamber 19 is circularly shaped with an inlet 28 from the pipe line 24 placed in the outer edge of the swirl chamber 19, which gives the inflowing working medium a primarily tangential flow direction upon entry into the swirl chamber 19. The working medium is circulated in the swirl chamber 19 in a helical path. Radiant heat from the combustion chamber 3 heats the swirl chamber 19, whereupon the working medium skims the heat transfer surface of the swirl chamber 19 several times before it exits into the turbine 2 via the outlet 29 of the swirl chamber 19. It is desirable that the working medium has a long dwell time in the swirl chamber 19 to achieve desired heating. In order to further extend the dwell time in the swirl chamber 19, the same may be provided with a central elevation 30 opposite the outlet 29, which facilitates the circulation.

The second heat exchanger device 9 is adapted to raise the temperature of the working medium to 650-900° C., which would give an efficiency of the gas turbine system of about 20-22%. A preferred material for the high-temperature section is sintered or cast ceramics, which has good thermal properties.

The second heat exchanger device 9 may advantageously be formed as a modular component for a simple supplement to the combustion chamber 3, which also facilitates replacement upon wear. The outer diameter of the primary side 16 of the second heat exchanger device 9 is adapted to the internal diameter of the combustion chamber 3 in order to form an air-proof connection upon joining the same two components.

When the temperature in the combustion chamber 3 amounts to about 650-1200° C., a temperature gradient may arise between the external wall 13 of the combustion chamber and the outer cover 14 of the gas turbine system, which is in contact with the ambient temperature. The temperature gradient may cause deformations of the gas turbine system because of different material expansion of the external wall 13 of the combustion chamber and/or the outer casing 14, which preferably is welded steel.

To counteract deformations, the external wall 13 of the combustion chamber and/or the outer casing 14 may be corrugated, which provides a bellows function where the material is allowed to expand in the axial direction without causing undesired deformation.

The gas turbine system may furthermore be equipped with a pipe line 25 between the outlet 21 of the turbine 2 and the inlet 4 of the combustion chamber 3. Accordingly, the working medium is returned to the combustion chamber 3, where it heats the supplied fuel before initiating combustion. Thereby, the fuel consumption is reduced by virtue of less heat needing to be supplied to the combustion chamber 3 compared with, for instance, Stirling engines.

In a preferred embodiment, the gas turbine system may furthermore comprise means for the regulation of the flow of gas of the working medium and/or of the flue gas partly past the first 8 and/or the second heat exchanger device 9. This means or regulator may consist of one or more valves having pipe lines to feed, for instance, the working medium from the compressor 1 directly to the second heat exchanger device 9 or from the first heat exchanger device 8 directly to the turbine 2.

As the gas turbine system should be adapted to be integrated into a vehicle, such as a private car, it is of great importance that the system becomes sufficiently compact, and that the weight can be kept on a level with traditional internal combustion engines of piston type.

In an example of integration in a private car, the requirement of generated power is in the range of 10-100 kW, corresponding to the power of a micro turbine. The compact design of the low-temperature section formed as a monolithic unit allows an embodiment having a gas turbine in the form of a micro turbine, with the size of the system being given by a length of 700-1000 mm and a circumference of 400-600 mm.

By the hitherto known technique, such a size reduction would represent a considerable impairment of the efficiency, which is counteracted in the present invention by the utilisation of the radiant heat of the combustion chamber 3 to heat the working medium. For the size of the micro turbine system, a space for the insulation of further 30-50 mm is estimated. In particular, the area that surrounds the second heat exchanger device 9 of ceramics makes high demands as regards possible surface temperature. In this embodiment, the mass of the micro turbine system is calculated to about 34 kg.

The gas turbine system according to the present invention is not limited to any specific size, but may be applied to a gas turbine system of desired size and power. The material of the included components may of course be others than the above-mentioned materials that meet the requirements of strength and heat resistance of the gas turbine system, for instance metals or composite materials.

The heat transfer channels/passages of the first heat exchanger device may be arranged in such a way that the flue gas takes a substantially tangential flow direction around the combustion chamber and the working medium takes an axial flow direction along the combustion chamber. Also other designs are feasible, with both flow directions counter-directed in substantially the tangential direction, axial direction or helical at an angle to the central axis of the gas turbine system.

REFERENCE DESIGNATIONS

1 Compressor
2 Turbine
3 Combustion chamber
4 Combustion chamber inlet
5 Combustion chamber outlet
6 Fuel stock
7 Generator
8 First heat exchanger device
9 Second heat exchanger device/High-temperature section
10 Outlet openings
11 Heat transfer channel for flue gas
12 Heat transfer passage for working medium
13 External wall
14 Outer cover
15 Partition walls
16 Primary side
17 Secondary side
18 Heat radiation centre
19 Swirl chamber
20 Turbine inlet
21 Turbine outlet
22 Outlet flue gas
23 Pipe line (compressor—heat transfer passage)
24 Pipe line (heat transfer passage—swirl chamber)
25 Pipe line (turbine—combustion chamber)
26 Compressor inlet
27 Compressor outlet
28 Swirl chamber inlet
29 Swirl chamber outlet
30 Elevation

The invention claimed is:

1. An indirectly heated gas turbine system comprising:
a combustion chamber for the combustion of air and supplied fuel whereby flue gas is formed, the combustion chamber having a length along a central axis of the gas turbine system;
a turbine driven by a working medium;
a compressor rotatably connected to the turbine for compressing the working medium; and
a first heat exchanger device for the transfer of heat between the flue gas and the working medium, the first heat exchanger receiving the flue gas from the combustion chamber and the working medium from the compressor,
wherein the first heat exchanger device and the combustion chamber are integrally formed as a monolithic unit, the first heat exchanger device being substantially arranged within the length of the combustion chamber along the central axis.

2. The indirectly heated gas turbine system according to claim 1, wherein the combustion chamber is substantially cylindrical and the first heat exchanger device is arranged coaxially with the combustion chamber around an outer diameter of the combustion chamber.

3. The indirectly heated gas turbine system according to claim 2, wherein the first heat exchanger device comprises a convection heat exchanger through which the working medium and the flue gas have counter-directed flow directions.

4. The indirectly heated gas turbine system according to claim 2, wherein the first heat exchanger device comprises a plurality of heat transfer channels for the flue gas, the heat transfer channels running longitudinally along the combustion chamber and symmetrically arranged and equidistantly distributed around a circumference of the combustion chamber.

5. The indirectly heated gas turbine system according to claim 4, wherein the first heat exchanger device comprises a helical heat transfer passage for the working medium running substantially tangentially around the circumference of the combustion chamber.

6. The indirectly heated gas turbine system according to claim 1, wherein the first heat exchanger device comprises a convection heat exchanger through which the working medium and the flue gas have counter-directed flow directions.

7. The indirectly heated gas turbine system according to claim 1, wherein the first heat exchanger device comprises a plurality of heat transfer channels for the flue gas, the heat transfer channels running longitudinally along the combustion chamber and symmetrically arranged and equidistantly distributed around a circumference of the combustion chamber.

8. The indirectly heated gas turbine system according to claim 7, wherein the heat transfer channels are substantially symmetrical in terms of flow for the flue gas at an outlet of the combustion chamber.

9. The indirectly heated gas turbine system according to claim 7, wherein the cross-sectional area in a plane perpendicular to the central axis of at least two adjacent heat transfer channels is substantially the same.

10. The indirectly heated gas turbine system according to claim 1, wherein the first heat exchanger device comprises a helical heat transfer passage for the working medium running substantially tangentially around a circumference of the combustion chamber.

11. The indirectly heated gas turbine system according to claim 1, further comprising a second heat exchanger device adjacent an outlet of the combustion chamber.

12. The indirectly heated gas turbine system according to claim 11, wherein the working medium passes through the second heat exchanger device prior to entering the turbine via an inlet of the turbine.

13. The indirectly heated gas turbine system according to claim 11, wherein the second heat exchanger device comprises a swirl chamber having a heat transfer surface that faces away from the combustion chamber, wherein the working medium skims the heat transfer surface a plurality of times before the working medium exits into the turbine.

14. The indirectly heated gas turbine system according to claim 11, wherein the second heat exchanger device forms a high-temperature section made from sintered and/or cast ceramics.

15. The indirectly heated gas turbine system according to claim 11, further comprising at least one valve for controlling the flow of the working medium past the first heat exchanger device and/or the second heat exchanger device.

16. The indirectly heated gas turbine system according to claim 15, further comprising at least one valve for controlling the flow of the flue gas past the first heat exchanger device and/or the second heat exchanger device.

17. The indirectly heated gas turbine system according to claim 11, further comprising a generator integrated in an inlet of the compressor, wherein an air flow through the compressor cools a plurality of stator windings of the generator.

18. The indirectly heated gas turbine system according to claim 11, further comprising at least one valve for controlling the flow of the flue gas past the first heat exchanger device and/or the second heat exchanger device.

19. The indirectly heated gas turbine system according to claim 1, further comprising a generator integrated in an inlet of the compressor, wherein an air flow through the compressor cools a plurality of stator windings of the generator.

20. The indirectly heated gas turbine system according to claim 1, wherein the first heat exchanger device and the combustion chamber together form a low-temperature section made from welded steel.

21. The indirectly heated gas turbine system according to claim 1, wherein at least one of an external wall of the combustion chamber and an outer cover of the gas turbine system is corrugated to form a bellows that is allowed to expand in the axial direction.

22. The indirectly heated gas turbine system according to claim 1, wherein the fuel consists of biomass fuel in solid form.

23. The indirectly heated gas turbine system according to claim 22, wherein the biomass fuel consists of wood pellets.

24. A vehicle powered at least in part by an indirectly heated gas turbine system comprising:
a combustion chamber for the combustion of air and supplied fuel whereby flue gas is formed, the combustion chamber having a length along a central axis of the gas turbine system;
a turbine driven by a working medium;
a compressor rotatably connected to the turbine for compressing the working medium; and
a first heat exchanger device for the transfer of heat between the flue gas and the working medium, the first heat exchanger receiving the flue gas from the combustion chamber and the working medium from the compressor, wherein the first heat exchanger device and the combustion chamber are integrally formed as a monolithic unit, the first heat exchanger device being substantially arranged within the length of the combustion chamber along the central axis.

25. The vehicle according to claim 24, wherein the indirectly heated gas turbine system further comprises a second heat exchanger device adjacent an outlet of the combustion chamber.

26. The vehicle according to claim 24, wherein the indirectly heated gas turbine system further comprises a generator integrated in an inlet of the compressor, wherein an air flow through the compressor cools a plurality of stator windings of the generator.

27. The vehicle according to claim 24, wherein the fuel consists of biomass fuel in solid form.

28. The vehicle according to claim 27, wherein the biomass fuel consists of wood pellets.

29. An indirectly heated gas turbine system comprising:
a compressor configured to provide a working medium;
a turbine configured to be driven by the working medium;
a monolithic unit including a combustion chamber and a first heat exchanger device, wherein the combustion chamber is configured to combust air and fuel to form flue gas, wherein the combustion chamber includes an outlet for providing the flue gas to the first heat exchanger device, wherein the first heat exchanger device is configured to receive the working medium from the compressor, wherein the first heat exchanger device is configured to transfer heat between the flue gas and the working medium, and wherein the first heat exchanger device is arranged coaxially around an outer diameter of the combustion chamber; and
a second heat exchanger device located adjacent the outlet of the combustion chamber, wherein the second heat exchanger device is configured to receive the working medium from the first heat exchanger device, and wherein the second heat exchanger device is configured to transfer heat from the combustion chamber to the working medium before providing the working medium to the turbine.

* * * * *